(12) United States Patent
Breuer et al.

(10) Patent No.: US 6,205,247 B1
(45) Date of Patent: Mar. 20, 2001

(54) METHOD AND ARRANGEMENT FOR PATTERN RECOGNITION ON THE BASIS OF STATISTICS

(75) Inventors: Thomas Breuer, Constance; Wilfried Hanisch, Radolfzell; Jürgen Franke, Ulm, all of (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/202,027

(22) PCT Filed: May 23, 1997

(86) PCT No.: PCT/EP97/02649

§ 371 Date: Dec. 8, 1998

§ 102(e) Date: Dec. 8, 1998

(87) PCT Pub. No.: WO97/48069

PCT Pub. Date: Dec. 18, 1997

(30) Foreign Application Priority Data

Jun. 8, 1996 (DE) .............................................. 196 23 033

(51) Int. Cl.$^7$ ................................ G06K 9/62; G06K 9/68

(52) U.S. Cl. ........................ 382/228; 382/156; 382/159; 382/224; 382/227

(58) Field of Search .................................. 382/155, 156, 382/157, 159, 224, 228, 227

(56) References Cited

U.S. PATENT DOCUMENTS

| | | | |
|---|---|---|---|
| 5,671,333 | * 9/1997 | Catlett et al. | 706/12 |
| 5,796,924 | * 8/1998 | Errico et al. | 706/25 |
| 5,805,731 | * 9/1998 | Yaeger et al. | 382/228 |
| 5,854,855 | * 12/1998 | Errico et al. | 382/187 |
| 5,859,925 | * 1/1999 | Yaeger et al. | 382/158 |

OTHER PUBLICATIONS

Patrikar, et al. "pattern classification using polynomial networks", IEEE, pp. 1109–1110, Jun. 1992.*

Franke, et al. writing style detection by statistical combination of classifiers in form reader applications, IEEE, pp. 581–584, 1993.*

Leisch, et al. "NN classifiers: reducing the computational cost of cross–validation by active pattern selection", IEEE, pp. 91–94, 1995.*

"Zur Zeichen—und Worterkennung beim automatischen Anschriftlesen" by J. Schürmann. Wissenschafliche Berichte AEG Telefunken, vol. 52, No. 1–2, 1979, pp. 31–38.

"Generation of Polynomial Discriminant Functions for Pattern Recognition" by D.F.Specht. IEEE Trans. On Electronics Computers, Vol.ec–16, No. 3, Jun. 1967, pp308–319.

* cited by examiner

Primary Examiner—Leo H. Boudreau
Assistant Examiner—Daniel G. Mariam
(74) Attorney, Agent, or Firm—Venable; George H. Spencer; Robert Kinberg

(57) ABSTRACT

A method and an arrangement are presented for pattern recognition on the basis of statistics. According to the method, for an object to be recognized on the basis of a complete set of two-class or multiclass classifiers, the association with each target class of the class set is estimated with a numerical value that is produced by cascaded use of polynomial classifiers. According to the invention, on a learning sample in which all class patterns to be recognized are sufficiently represented, there is a selection, from all the two-class or multiclass classifiers by way of their estimation vector spectrum, of those two-class or multiclass classifiers with estimations contributing the most to minimize a scalar quantity calculated over the estimation vector spectrum and having high separating relevance. The selected two-class or multiclass classifiers are subsequently used to form, via an expanded learning sample, estimation vectors from which expanded characteristic vectors are produced by polynomial linking. An evaluation classifier is formed on the basis of said characteristic vectors for estimating all target classes.

9 Claims, 5 Drawing Sheets

METHOD AND ARRANGEMENT FOR PATTERN RECOGNITION ON THE BASIS OF STATISTICS

BACKGROUND OF THE INVENTION

Pattern recognition is becoming increasingly significant in the era of electronic data processing. Its range of use extends from automation technology to machine-based image and text processing, where it is used for automatic letter distribution (address reading) or to evaluate formulas or documents. The objective of pattern recognition is to allocate to a piece of electronically pre-processed image information an identification that reliably coincides with the true meaning of the pattern. Statistics-based pattern-recognition methods assess a digitized piece of image information with estimates from which the degree of association of the pattern with a class of patterns can be read. With K given target classes, the class whose estimation result corresponds to the maximum of all K estimates is generally awarded this assessment. A recognition system is more reliable the more frequently the target class estimated as the maximum class matches the true target class (meaning). A network classifier used to this point, which comprises a complete ensemble of two-class classifiers and has the task of discriminating the K target classes, is based on the fact that a two-class classifier is calculated for all possible K*(K−1)/2 class pairs. During a reading operation, for the present pattern, each of the two-class classifiers supplies an estimate of the association of the pattern with one of the two fundamental target classes. The result is K*(K−1)/2 estimates, which are not independent among themselves. From these K*(K−1)/2 estimates, K estimates are to be formed, one for each target class. The theory provides a mathematical rule for this relationship, which is described in Wojciech W. Siedlecki, A formula for multiclass distributed classifiers, Pattern Recognition Letters 15 (1994). The practice of classifiers demonstrates that the applicability of this rule is unsatisfactory, because the two-class classifiers supply no statistical conclusion probabilities as soon as they estimate a foreign pattern that is not part of their adapted class range. In practice, this means that shutoff mechanisms must deactivate those classifiers that are not responsible for the pattern as early as possible. The shutoff rules used to this point in practice are largely of a heuristic nature. Consequently, an element of arbitrariness that is not statistically controlled is factored into the processing of network classifiers. This rule-based iteration of variables that experience a measurable statistic behavior significantly worsens the recognition results. Rule-based iteration of network classifiers additionally prevents the possibility of effectively re-training the classifier system when the samples are changed. With 30 or more classes to be discriminated, the use of network classifiers also meets with fundamental problems:

1. The number of components (pair classifiers) to be stored increases quadratically with the number of classes (K*(K−1)/2).
2. An assessment and combination of the component-related estimates into a reliable total estimate becomes increasingly less reliable with a growing number of classes.
3. Adaptations of a network classifier to country-specific writing styles incur considerable costs in the adaptation phase.

OBJECTS AND SUMMARY OF THE INVENTION

The object of the invention is to create a statistics-based pattern-recognition method and an arrangement for executing the method, with which the outlined problems of the state of the technology are avoided, with a large class number and for justifiable costs, and which is capable of performing general recognition tasks in real time, avoiding a rule-based iteration of network classifiers.

A particular advantage attained with the invention is a significant increase in recognition reliability through the avoidance of heuristic shutoff rules. Following the selection of the two- or multi-class classifiers and the generation of the assessment classifier, the entire set of statistics of the application is represented in the moment matrix used as the basis of the assessment classifier. Because only the reduced sequence of the two- or multi-class classifiers need be stored together with the assessment classifier, the memory load is very economical. Because polynomial classifiers manage all operations following the image-feature preparation by means of addition, multiplication and arrangement of natural numbers, more complex calculations for example floating-point simulation on the target hardware, are completely omitted. Memory-hogging table-creating mechanisms can also be omitted. These circumstances permit the focus of the target hardware design to be optimizing the transit time. In one embodiment of the invention, the sum of the error squares in the discrimination space is selected as a scalar separation measure (classification measure). The advantage of this is that a ranking by contribution to the minimizing of the residual error is explicitly formed among the components over the course of the linear regression accompanying the calculation of the linear classifier. This ranking is utilized in selecting from the available two- or multi-class classifiers, which selection forms the reduced set of pair classifiers as a result. The method of minimizing the residual error is described in detail in Schurmann, Statistischer Polynomklassifikator [Statistical Polynomial Classifier], R. Oldenburg Verlag [Publisher], 1977.

Another embodiment uses the entropy in the distribution space of the estimation vectors as a scalar separation measure. To evaluate the entropy, the frequency of appearance of each state of all pair-classifier estimates over the quantity of all states must be determined. Then, the partial system that produces the least entropy is determined. In the embodiment, a large quantity of target classes is divided into numerous quantities of target classes, for which a selection of the two- or multi-class classifiers is made, and from this, the assessment classifier is generated. A resulting total estimate is then determined from the results of the assessment classifiers. The resulting total estimate can be calculated in various ways:

In one embodiment a Cartesian-expanded product vector is formed from the result vectors of the assessment classifiers, from which a resulting quadratic assessment classifier is formed which determines the total estimate.

2. A Cartesian product vector is also formed in a second embodiment. By means of a subspace transformation U, this vector is converted into a shortened vector, of which only the most crucial components corresponding to the eigenvalue distribution of the transformation matrix U are used to adapt a quadratic classifier. This quadratic classifier then maps the transformed and reduced vector for an estimation vector onto the target class.

3. Fundamentally, in another embodiment a meta-class classifier, which is trained over groups of class quantities, generates estimates for the groups prior to activation of the respective selection of the two- or multi-class classifiers. Afterward, the two- or multi-class classifiers for the characters of the groups whose estimated value lies above an established threshold are activated. To determine the total estimate, the group estimates are linked to the estimates of the respective, associated character-assessment classifiers for the character target classes according to a unified rule such that the sum of all character estimates obtained in this manner yields a number that can be normalized to 1. The first variation yields the most precise results with the most computational effort, while the second and third variations contribute to the reduction in the computational effort.

BRIEF DESCRIPTION OF THE DRAWINGS

The realization of the invention can be divided into five phases. Each phase of the invention is described in detail in the following section, with reference to a respective drawing. Shown are in.

BRIEF DESCRIPTION OF THE INVENTION

The invention is explained below by way of ensembles of two-class classifiers (pair classifiers), but is not limited in principle to this specification.

Figure 1:
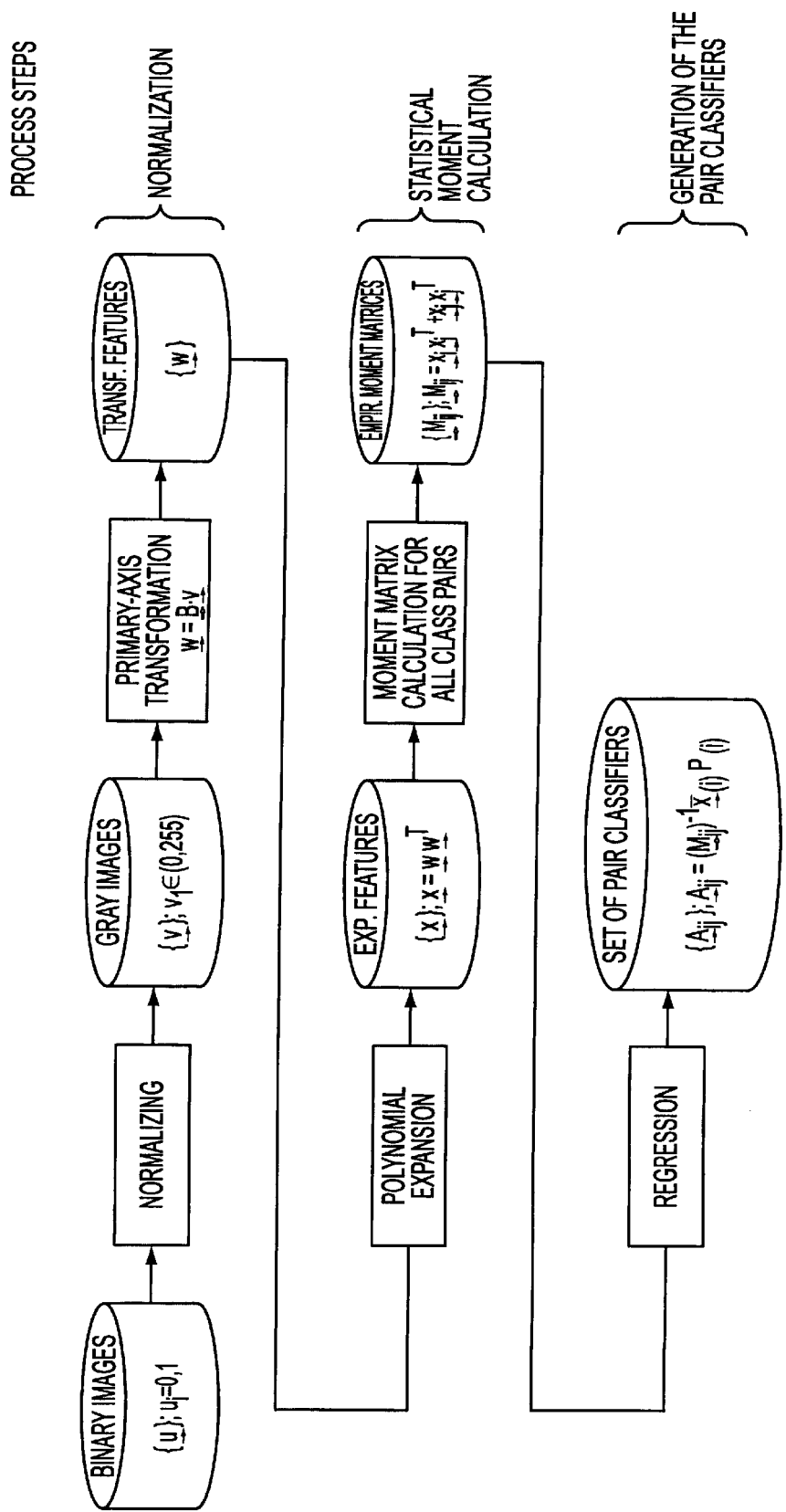
FIG. 1 the procedure in the generation of a complete set of pair classifiers of a network classifier.

Generation of a network classifier:

In accordance with FIG. 1, this process step begins with the binary images. An image vector $\vec{u}$ that has been converted into binary form is present for each image from the learning sample. In principle, the black pixels of the image are represented by 1, while the white pixels are encoded with 0. In addition, a human-issued reference identification is created for each pattern; this identification unambiguously encompasses the meaning of the pattern. Normalization transforms the binary image into a gray image based on measurements of the local and global pixel proportions. In the process, the feature vector $\vec{v}$ is formed, which has 256 components, with each component containing gray values from the scaling range [0, 255]. The vectors $\vec{v}$ are subjected to a principal-axis transformation with the matrix $\vec{B}$. The result of this matrix-vector multiplication is the image vector $\vec{w}$. The image vector w is now polynomial-expanded to the vector $\vec{x}$ according to an established imaging rule. For a two-dimensional $\vec{W}$ vector (w1, w2), the linking rule PSL1=LIN1, 2QU/AD11,12,22
is used to generate, for example, the following x vector:

$\vec{x}$=(1, w1, w2, w1*w1, w1*w2, w2*w2). The first component is always set in advance with 1 so that the estimated values generated later can be normalized to a sum of 1. Over the polynomial-expanded quantity of vectors $\{\vec{x}\}$, empirical moment matrices $\vec{M}_{ij}$ are then generated for each pair (i,j) of classes in accordance with Formula (2). (See below) Class i includes only characters that the person has referenced as belonging to Class i. Each moment matrix is subjected to a regression in accordance with the method described in Schürmann J., Polynomklassifikatoren für die Zeichenerkennung

[Polynomial Classifiers for Sign Recognition]. In accordance with Formula (1), below the classifiers $\vec{A}_{ij}$ result for each class pair (i,j). The ensemble of K*(K−1)/2 pair classifiers thus results as the network classifier. Each of these pair classifiers (two-class discriminators) is trained over corresponding pattern data such that it recognizes exactly two of the K available target classes. The following relationships apply:

$$A(i, j)[k] = \sum_l M^{-1}(i, j)[k, l] * \bar{x}(i)[l] * p(i) \quad (1)$$

with $$M(i, j)[k, l] = \frac{1}{z(i, j)} \sum_{\{(i,j)\}} x(z)_k x(z)_l - \quad (2)$$

(empirical moment matrix of second order)

z(i,j)—number of characters of the classes (i,j)' where $\bar{x}(i)[l]$ is the average-value vector for the feature vector x(i) in the component representation, and p(i) is the frequency of appearance of Class i. In the present feature vector $\vec{x}$, the classifier A(i,j) estimates the value d(i,j) on Class i, where $$d(i, j) = \sum_l A(i, j)[l] * x[l]. \quad (3)$$

The classifier coefficients A(i,j) [l] are set such that the following always applies:

$$d(i, j) + d(j, i) = 1. \quad (4)$$

Figure 2:
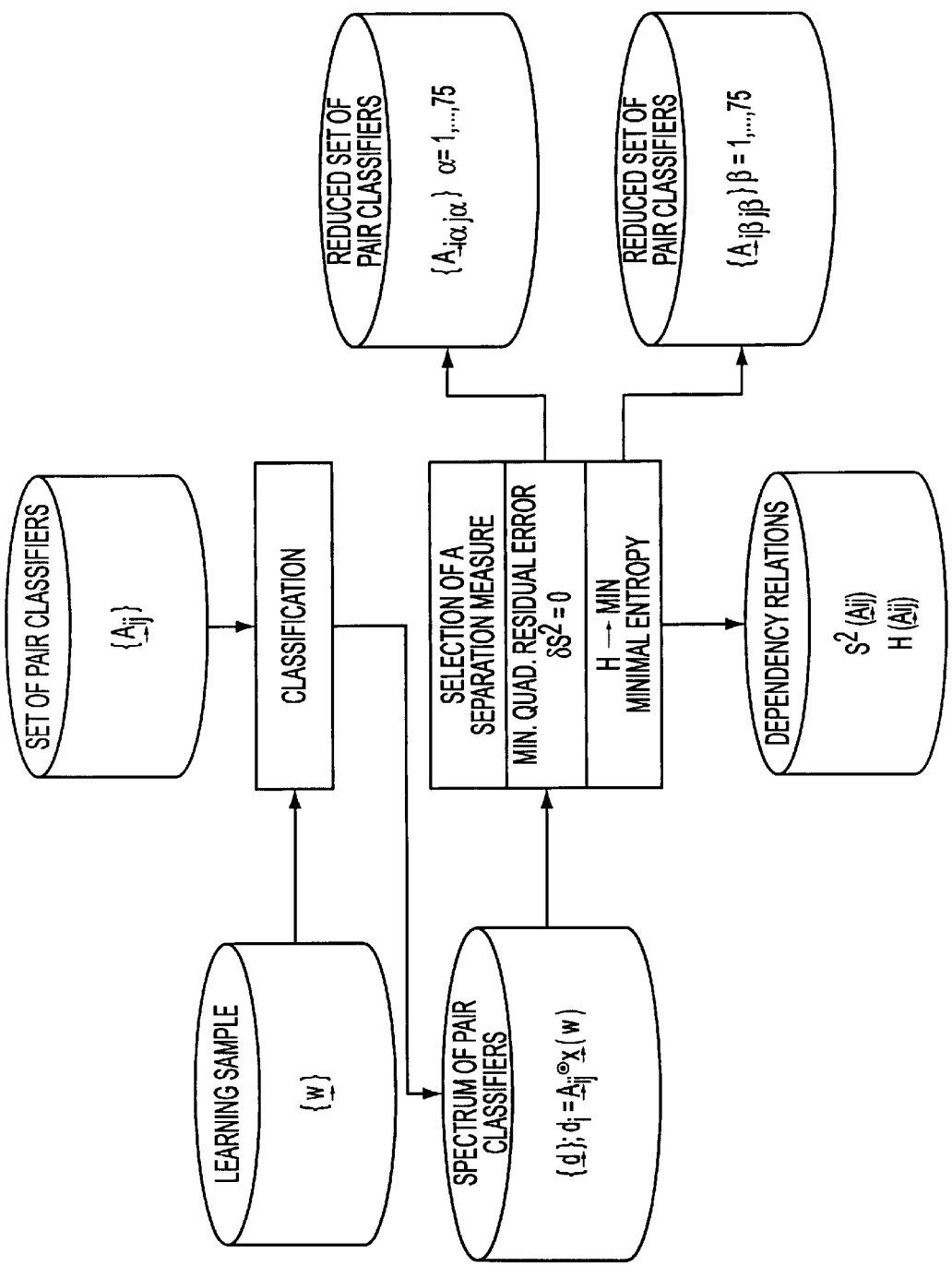
FIG. 2 the procedure in the generation of a reduced set of pair classifiers.

Reduction in the number of pair classifiers: This process step is shown schematically in FIG. 2. After a network classifier has been generated, its estimation-vector spectrum {d(i,j)} is received over a learning sample that is virtually uniformly distributed by class, and in which all of the class patterns to be recognized are represented sufficiently. Classification first generates polynomial-expanded vectors $\vec{x}(\vec{w})$ from the image vectors $\vec{w}$ that have undergone principal-axis transformation. The spectrum of pair classifiers is the quantity of all d vectors $\{\vec{d}\}$ resulting from the classification of the learning sample with all pair classifiers. A single d vector is formed because, for each pair classifier $\vec{A}_{ij}$, a scalar product having the vector $\vec{x}$ is formed for an expanded image vector $\vec{x}$ of a sign of the learning sample, and the results of the scalar products are entered into the vector $\vec{d}$ in the sequence of pair classifiers. Statistical operations are performed below on the feature quantity {d(i,j)} to determine the partial system of pair classifiers $\{\vec{A}(i_\alpha, j_\alpha)\}$, which, as a target presetting, minimizes a scalar measure possessing a high separation relevance. The reduction method employing the following two scalar classification measures is explained by way of example:

Sum of the error squares $S^2$ in the D (I) discrimination space $$S^2 = \frac{1}{N} \sum_{\{z\}} \sum_{I=1}^{K} (D_I - Y_I)^2 \qquad (5)$$

where $$\exists A_{I,j,k}^{Lin}, D_I = \sum_{j=1}^{K-1} \sum_{k=j+1}^{K} A_{I,j,k}^{Lin} * d(j,k) \qquad (6)$$

$D_I$—estimate of the classifier on Class I $$Y_I = \begin{cases} 1 \text{ if } z \in \{I\} \\ 0 \text{ otherwise.} \end{cases}$$

The classifier $A^{Lin}$ is generated according to Equation (1). It is therefore linear, because the linear d vector $\vec{d}$ constructed from the ordered pair estimates $d(i,j)$ and expanded by 1 to the first place is used in calculating the moment matrix according to Equation (2) as an x vector. An advantage of this variation is that, over the course of the linear regression accompanying the calculation of the linear classifier $A_{I,j,k}^{Lin}$, a ranking according to the extent of the contribution to minimizing the residual error is explicitly formed among the components $d(i,j)$. This ranking is used to make a selection from the $K*(K-1)/2$ available pair classifiers, which form the reduced set of pair classifiers as a result. The method of (successively) minimizing the residual error need not be discussed in detail here. It is described in detail in Schürmann J., Polynomklassifikatoren für die Zeichenerkennung [Polynomial Classifiers for Sign Recognition], Section 7. The selection is limited to the 75 highest-ranked components. This limitation is a function of the primary storage capacity of the calculating machine used for adaptation, and thus does not represent a fundamental limitation. The result of the linear regression over the feature quantity $\{d(i,j)\}$ is therefore an ordered quantity $\{A(i_\alpha, j_\alpha)\}_{\alpha=1, \ldots, 75}$ of pair classifiers, which offer a decreasing relative contribution to reducing the quadratic residual error as the index $\alpha$ increases. Only this selected quantity of pair classifiers continues to be used over the further course of adaptation.

Entropy in the $d(i,j)$ distribution space To form the entropy H of the unstructured ensemble of two-class discriminators, it is necessary to calculate the following expressions:

$$H = \sum_{\{i,j\}} H_{i,j} \qquad (7)$$

$$H_{i,j} = -\sum_{I} \sum_{\{d(i,j)\}} p(I \mid d(i,j)) * \log_2 p(I \mid d(i,j)) * p(d(i,j)) \qquad (8)$$

The expression $p(I|d(i,j))$ is, per definition, the Bayes reverse probability that the classifier $A(i,j)$ has classified a Class I pattern with a given estimate $d(i,j)$. With use of the Bayes' formula:

$$p(I \mid \alpha) = \frac{p(\alpha \mid I) * p(I)}{\sum_{J=1}^{K} p(\alpha \mid J) * p(J)} \qquad (9)$$

and the following definition:
$N_{i,j,\alpha,J}$: number of Class J characters, for which the following applies:

$$UR+(OR-UR)/MAX*(\alpha-1) \leq d(i,j) < UR+(OR-UR)/MAX*\alpha \qquad (10)$$

$$\alpha=1, \ldots, MAX, \qquad (11)$$

it becomes possible to approximate the entropy H with arbitrary precision through an empirical entropy H*. The parameters:
UR:=lower estimate threshold
OR:=upper estimate threshold
MAX:=number of histogram segments
are determined on the basis of the estimation-vector spectrum. The values $N_{i,j,\alpha,J}$ are then incremented over the learning sample of patterns. After $N_{i,j,\alpha,J}$ have been determined, the following values can be calculated:

$$H^* = \sum_{\{i,j\}} H_{i,j}^* \qquad (12)$$

$$H_{i,j}^* = \frac{-1}{N} \sum_{\alpha=1}^{MAX} \sum_{I=1}^{K} N_{i,j,\alpha,I} * \log_2 \frac{N_{i,j,\alpha,I}}{\sum_{J=1}^{J=K} N_{i,j,\alpha,J}} \qquad (13)$$

$$V_{i,j}^*[I][\alpha] := \begin{cases} -N_{i,j,\alpha,I} * \frac{\log_2 N_{i,j,\alpha,I}}{\sum_{J=1}^{K} N_{i,j,\alpha,J}}; 1 \leq \alpha \leq MAX \\ 0; \text{ otherwise} \end{cases} \qquad (14)$$

$$DOT(i,j;k,l) := \sum_{J=1}^{K} \sum_{\alpha=1}^{MAX} V_{i,j}^*[J][\alpha] * V_{k,l}^*[J][\alpha] \qquad (15)$$

$$COS(i,j;k,l) := \frac{DOT(i,j;k,l)}{\sqrt{DOT(i,j;i,j) * DOT(k,l;k,l)}} \qquad (16)$$

$$ANG(i,j;k,l) = \arccos COS(i,j;k,l) \qquad (17)$$

$$-MAX \leq \beta \leq +MAX \qquad (18)$$

$$COR^+(i,j;k,l) := \max_{\beta} \frac{\sum_{J=1}^{K} \sum_{\alpha=1}^{MAX} V_{i,j}^*[J][\alpha] * V_{k,l}^*[J][\alpha-\beta]}{\sqrt{DOT(i,j;i,j) * DOT(k,l;k,l)}} \qquad (19)$$

$$COR^-(i,j;k,l) := \max_{\beta} \frac{\sum_{J=1}^{K} \sum_{\alpha=1}^{MAX} V_{i,j}^*[J][\alpha] * V_{k,l}^*[J][MAX-\alpha-\beta]}{\sqrt{DOT(i,j;i,j) * DOT(k,l;k,l)}} \qquad (20)$$

$$COR(i,j;k,l) := \max\{COR^+(i,j;k,l); COR^-(i,j;k,l)\} \qquad (21)$$

After the calculation has been made, all statistical values connected with the entropy are determined. Now the partial system
1. whose sum of individual entropies produces a minimal total entropy and
2. whose components have the statistically smallest-possible correlations among themselves must be determined. These two conditions are met by adhering to the following selection criteria:
1. Entropy ranking:
   Establish the sequence $A(i_\alpha, j_\alpha)$, which is unambiguous up to the classifiers having identical entropy, with:

$$H^*_{i_1, j_1} \leq H^*_{i_2, j_2} \leq \ldots \leq H^*_{i_n, j_n} \qquad (22)$$

2. Start of induction:
   Select $A(\vec{i}_1, \vec{j}_1) := A(i_1, j_1)$ as the starting candidate. This is the classifier having minimal entropy.
3. End of induction from k to k+1:
   Here k candidates $A(\vec{i}_1, \vec{j}_1), \ldots, A(\vec{i}_k, \vec{j}_k)$ are selected, where $$H^*_{i_1, j_1} \leq \ldots \leq H^*_{i_k, j_k} := H^*_{i_m, j_m} \quad (23)$$

and $$\exists A(i_m, j_m) \; A,(i_m, j_m) = A(\vec{i}_k, \vec{j}_k); \; k \leq m < n \quad (24)$$

and $$ANG(\vec{i}_\alpha, \vec{j}_\alpha; \vec{i}_\beta, \vec{j}_\beta) > \Theta_{crit}; \; 1 \leq \alpha < \beta \leq k. \quad (25)$$

Determine a smallest l with $$l = 1, \ldots, n-m \quad (26)$$

such that $$ANG(\vec{i}_\alpha, \vec{j}_\alpha; \vec{i}_{m+1}, \vec{j}_{m+1}) > \Theta_{crit}; \; \alpha = 1, \ldots k \quad (27)$$

If l exists, select:

$$ANG(\vec{i}_{k+1}, \vec{j}_{k+1}) := A(i_{m+1}, j_{m+1}) \quad (28)$$

Otherwise, terminate with k candidates. The free angle parameter $\Theta_{crit}$ can be set through gradient methods so as to yield a defined number of selected components. The selection criterion is refined through the minimizing of the correlation coefficient COR(i,j;k,l). In this case, the filter condition (25) is:

$$COR(\vec{i}_\alpha, \vec{j}_\alpha; \vec{i}_\beta, \vec{j}_\beta) < \chi_{crit}; \; 1 \leq \alpha < \beta \leq k. \quad (29)$$

The maximum permitted correlation coefficient between two respective pair classifiers is thus limited by $\chi_{crit}$. The correlation coefficient further meets the symmetry conditions:

$$COR(i,j;k,l) = COR(j,i;k,l) \quad (30)$$

$$COR(i,j;k,l) = COR(i,j;l,k) \quad (31)$$

$$COR(i,j;k,l) = COR(k,l;i,j) \quad (32)$$

The method is embodied for the aforementioned classification measures, but is not limited to them in principle. Other embodiments of the method may be based on other classification measures.

Figure 3:
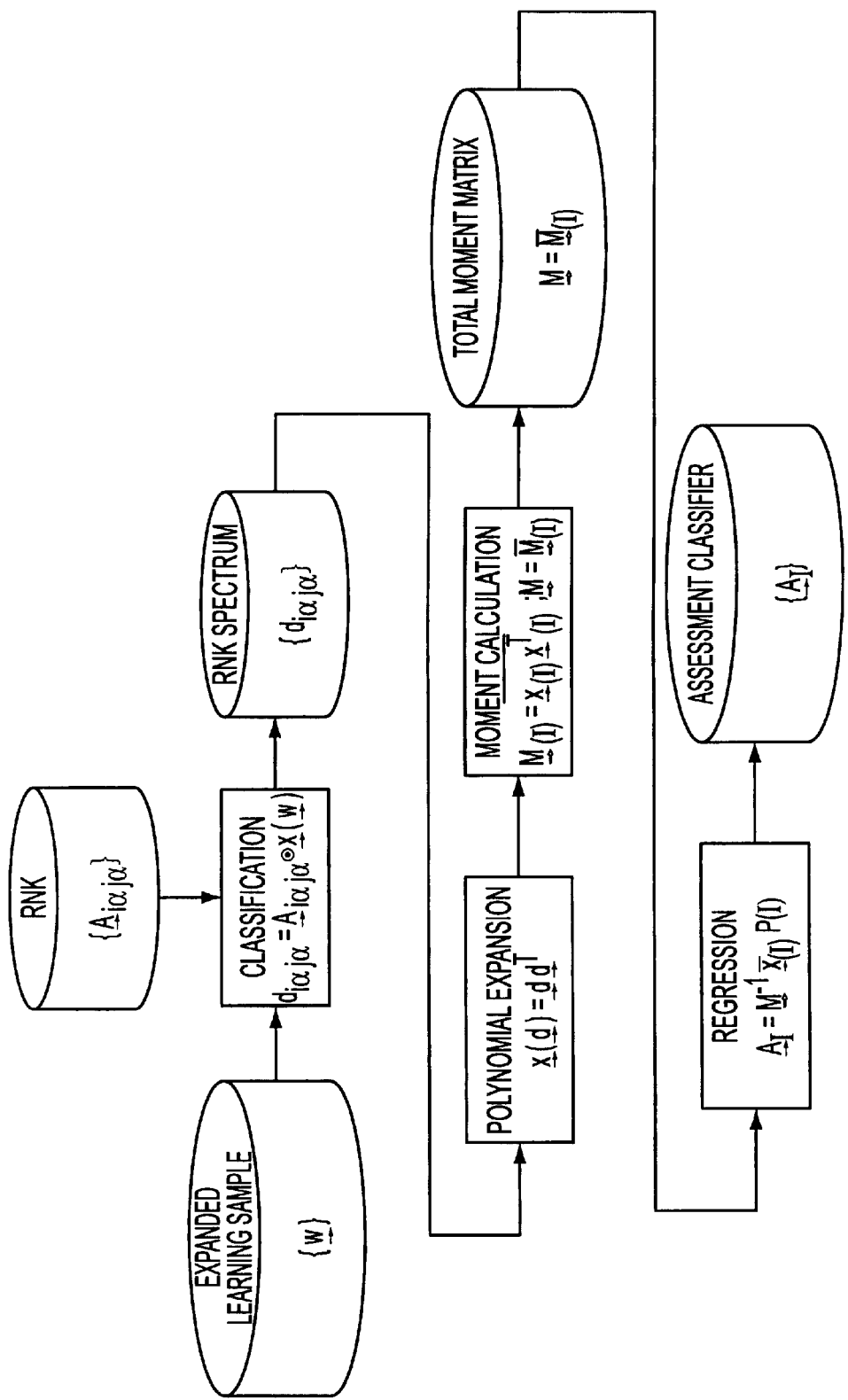
FIG. 3 the procedure in the generation of an assessment classifier.

Generation of an assessment classifier: This process step is illustrated in FIG. 3. After the reduced sequence of pair classifiers $\{\vec{A}_{i_\alpha, j_\alpha}\}$ has been determined identified in FIG. 3 as (RNK), this is used over an expanded learning sample that contains at least 9,000 patterns per discrimination class to calculate estimate vectors. The resulting feature quantity $\{d(i_\alpha, j_\alpha)\}$ comprises individual vectors of the dimension 75, with the target identification (pattern meaning) for each pattern being entered synchronously from the quantity of image features. A quadratic expansion to a vector $\vec{x}$ that is linked in polynomial fashion is effected over each feature vector. Then a moment matrix $\vec{M}_{(I)}$ is generated for each Class I on the basis of the vectors $\vec{x}$. A total moment matrix $\vec{M}$ is generated through weighted averaging over all classwise moment matrices $\vec{M}_{(I)}$. A regression then generates the class-wise assessment classifiers according to the following formula:

$$\vec{A}_I = \vec{M}^{-1} * \vec{x}_1 * P(I) \quad (33)$$

where P(I) is the frequency of appearance of Class I.

Hence, without further hypotheses about the relationship between pair-classifier estimates and the total estimate for the individual classes, an instrument is created that calculates this relationship from the approximate statistical distribution in the d(i,j) space. The more general the underlying learning sample, the better the computational approximation of the optimum relationship between pair estimates and the total estimate. The successes of the method particularly demonstrate that the measure of arbitrariness in the selection of suitable learning samples is more limited than the measure of arbitrariness that is a given in the construction of a hypothetical mathematical relationship. The adaptation phase ends with the generation of a reduced set of pair classifiers and the assessment classifier coupled to this set. The total statistics of the application are now represented in the moment matrix underlying the assessment classifier. This moment matrix is administered in the archives for the following adaptation procedures. For integration into the product, only the reduced sequence of pair classifiers is associated with an appropriate assessment classifier. The method thus permits the generation of extremely-compressed units of information (moment matrices), which represent a given application of pattern recognition and can be used for future iterations (country-specific adaptations).

Figure 4:
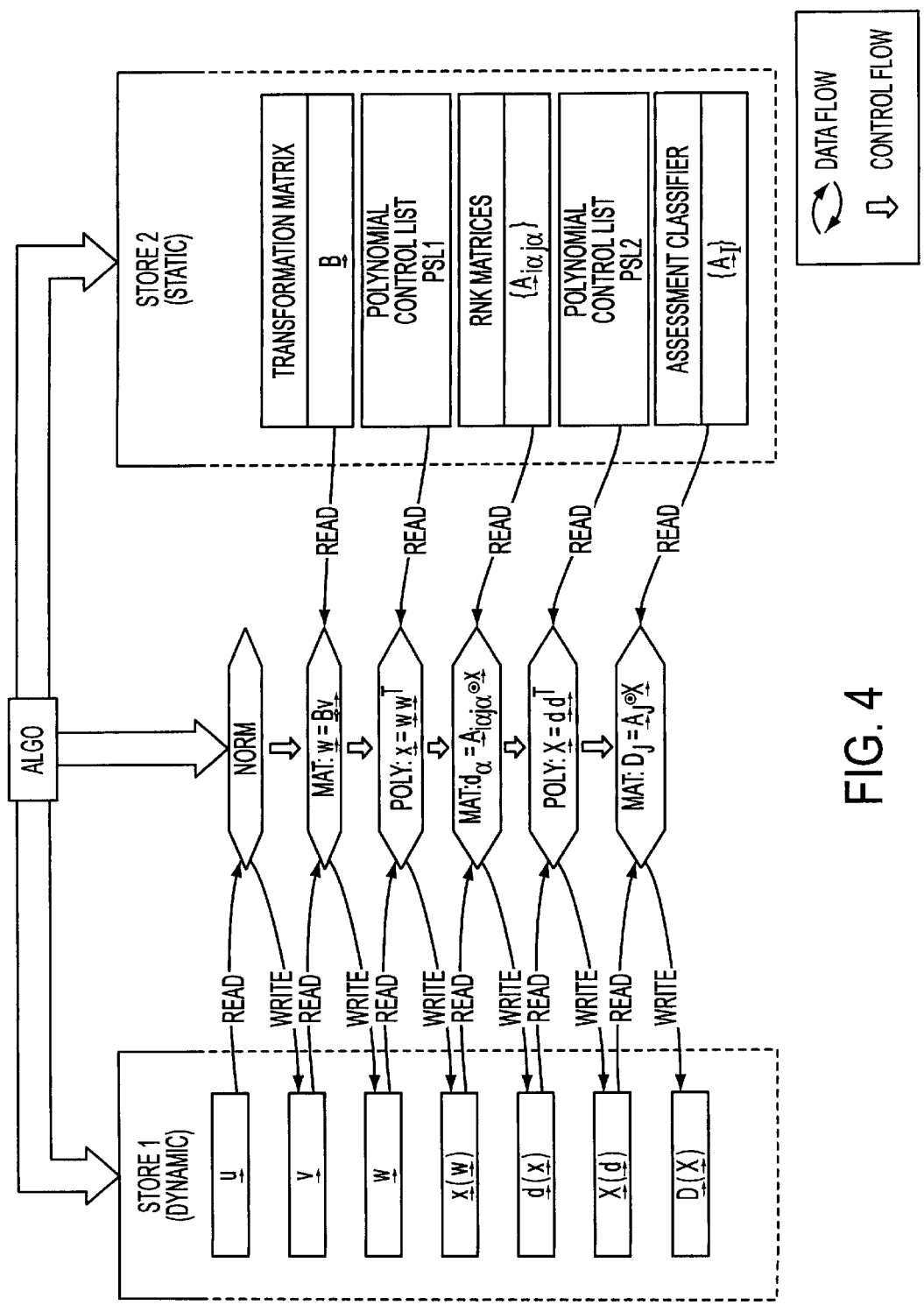
FIG. 4 the procedure in pattern recognition in an arrangement of the invention.

Use of the method of the invention in a corresponding arrangement:

This process step is shown schematically in FIG. 4. For use in a real-time system, the method makes available the ordered, reduced sequence of pair classifiers and an assessment classifier appropriate for the respective application. With insufficient knowledge of which assessment classifier provides the best results for the application, the selection can be increased, and a reading test verifies the optimum assessment classifier. The minimum requirement on a target hardware is dictated by the presence of the following components:

1. NORM: A module that employs the normalizing methods of the state of the technology to transform the feature vectors that have been converted into binary form, and places them in an input vector of constant length (v vector).
2. POLY: A module that, in accordance with an established imaging rule, transforms a normalized w vector into a polynomial-expanded x vector that serves as the input vector for classification.
3. MAT: A matrix-multiplication network that, with external micro-program control, calculates scalar products between integer vectors.
4. STORE: A memory for storing intermediate values and for addressing the classifier coefficients.
5. ALGO: A command register for storing control commands or machine codes to be executed.

The memory is partitioned into a unit STORE1 for storing and reading intermediate results and a unit STORE2 for reading unchangeable values.

The operations illustrated in FIG. 4 are necessary for the described method. The following steps are performed consecutively, with control by the command register ALGO:

1. The recognition process begins with the reading of the pixel image. After the pattern has been sampled, it is stored in STORE1 as a binary image vector $\vec{u}$. In principle, a black pixel corresponds to the binary 1 and a white pixel corresponds to 0. NORM now groups the binary image elements on the basis of measurements of the pixel densities by column and line such that the result is a gray-image vector $\vec{v}$, which corresponds to a 16×16 image matrix. Each element of the gray image is scaled into 256 stages of gray. NORM writes the vector $\vec{v}$ into STORE1.

2. The module MAT reads v out of STORE1 and the principal-axis transformation matrix $\vec{B}$ out of STORE2. This matrix is available from the adaptation phase through the execution of a standard principal-axis transformation over the feature quantity $\{\vec{v}\}$. The matrix and vector are multiplied. The result is the transformed image vector $\vec{w}$, which is stored in STORE1.

3. The module POLY reads the vector $\vec{w}$ out of STORE1 and a list PSL1 out of STORE2. PSL1 contains the control information about how the components of the vector $\vec{w}$ are to be linked. The x vector is generated and is stored in STORE1.

4. The module MAT reads the x vector out of STORE1 and the matrix elements of the RNK, which are stored by class as vectors $\vec{A}(i_a, j_a)$. MAT now forms a scalar product with the x vector for each A vector. The number of scalar products is identical to the number of present A vectors. The scalar products are transferred into the d vector in the sequence of the A vectors. MAT stores the d vector in STORE1.

5. The module POLY reads the d vector out of STORE1 and the PSL2 out of STORE2. POLY then constructs the X vector by applying PSL2 to the d vector, and stores the X vector in STORE1.

6. The module MAT reads the X vector out of STORE1, this time reading the A matrix of the assessment classifier out of STORE2. This matrix contains as many A vectors as classes estimated by the assessment classifier. After the reading-in process, MAT forms a scalar product with the X vector for each A vector. The scalar products are incorporated into the D vector in the sequence of the A vectors. MAT writes the D vector into STORE1.

After this loop is complete, the D vector that includes an estimate in the number interval [0, 1] is available in STORE1 as a result for each of the K classes of the discrimination problem. It is now the decision of a post-processing module whether to accept or reject the assessment of the classifier corresponding to the maximum estimate. Support of the post-processing is assured by the classification in that the continuous estimation-vector spectrum of the assessment classifier is known from the adaptation phase, from which spectrum thresholds for rejection or acceptance of an estimate, which are statistically guaranteed with the use of a cost model, can be derived. If the estimation-vector statistics are contained in cycles in reading operation, statistical prognoses can be derived through a dynamic readjustment of thresholds.

Application to general alphanumeric recognition:

In the recognition of a general class set comprising 10 numerals, 30 capital letters, 30 lowercase letters and 20 special characters, a total of at least 90 classes is to be discriminated. If it were desired to solve the recognition problem with a complete network classifier, 4005 pair classifiers would correspond to these 90 classes. Both storage capacity and calculation capacity of conventional reading electronics would thus be overloaded. The problem worsens if, instead of the 90 meaning classes, so-called gestalt classes are inserted for reasons of recognition theory, the gestalt classes representing the respective typical writing forms of the same sign class. Based on the gestalt classes, up to 200 classes must be separated.

Figure 5:
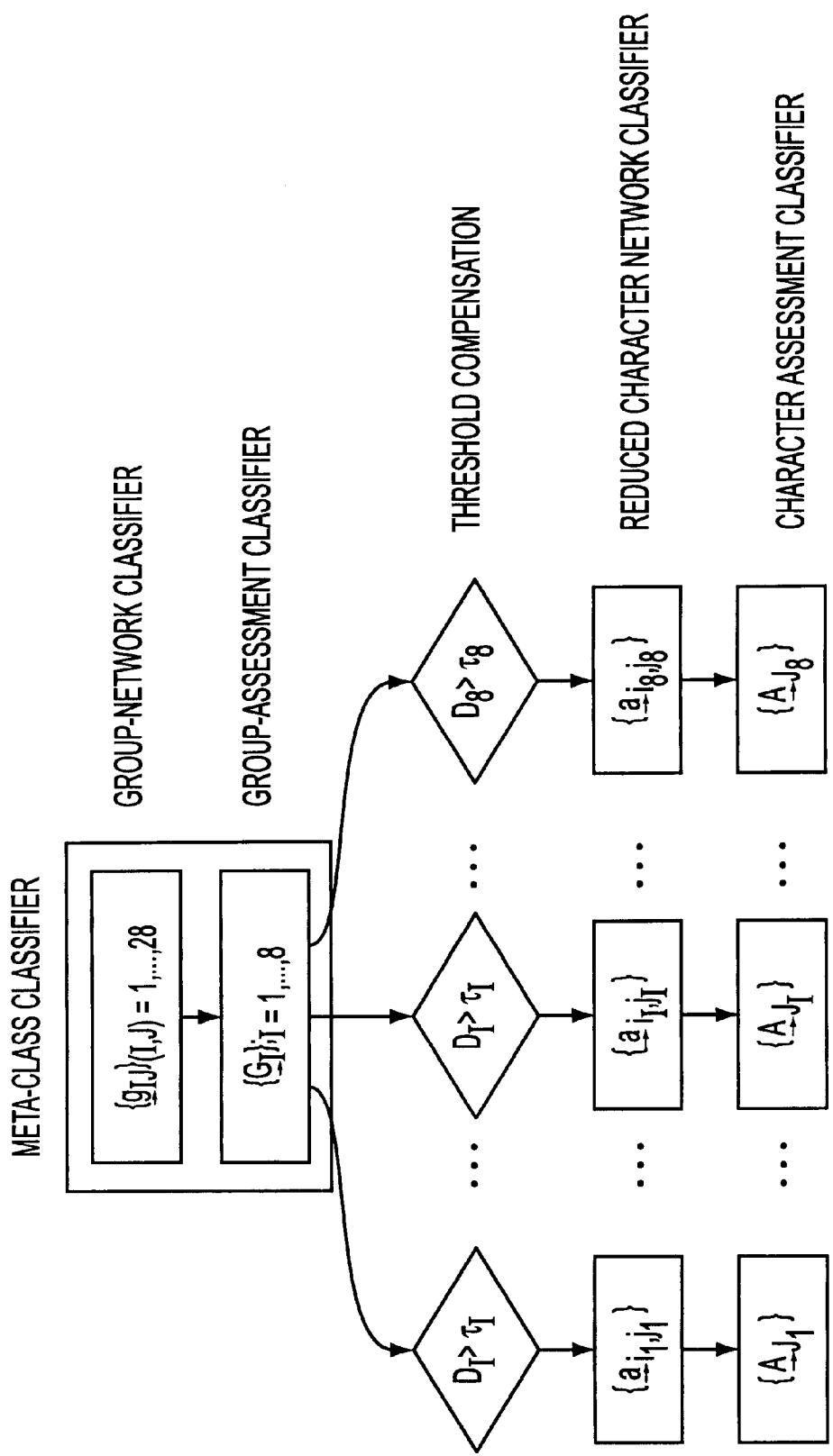
FIG. 5 the procedure in pattern recognition with a large number of classes, with the use of a meta-class classifier.

This problem is solved by training a meta-class classifier comprising a group-network classifier and a group-assessment classifier. The resulting classification system is illustrated in FIG. 5. In this case, the meta-class classifier recognizes groups of character. A metric calculated on the basis of the moment matrices of the individual gestalt classes clusters the character into groups. The groups are structured such that similar gestalt classes are in the same group. The moment matrix of a group is formed by weighted averaging over all of the moment matrices of the gestalt classes represented in the group. With eight groups, for example, encompassing a maximum of 30 gestalt classes, the meta-class classifier itself is realized as a coupling of a network classifier with an assessment classifier generated according to the invention.

Consequently, one pair classifier is formed for each group pair. The group-assessment classifier is then based on 28 pair classifiers $\vec{g}_{IJ}$. A group-assessment classifier $\vec{G}_I$, which estimates in the eight groups as classes, is trained on these pair classifiers. In the next step, for each group of gestalt classes, a reduced set of pair classifiers $\vec{a}_{i_j, j_j}$ having a corresponding assessment classifier $\vec{A}_{J_I}$ is trained according to the described method. In the reading phase, first the group-assessment classifier decides to which group the relevant character belongs. Subsequently, the reduced-character network classifier corresponding to the discriminated group(s) is activated as a function of thresholds. This classifier generates an estimated value for each gestalt class represented in the group. Thresholds $\tau_I$ are adjusted for each group on a statistical basis; these thresholds regulate from which estimate quality $D_I$ of the group-assessment classifier the corresponding reduced character network classifier $\vec{a}_{i_j, j_j}$ is to be activated. The thresholds can be set such that at least one of the reduced character network classifiers will reliably have the correct recognition result with the least-possible calculation effort. If results of numerous character-assessment classifiers are present, a normalized total result is formed in that all estimates of an activated character-assessment classifier $\vec{A}_{J_I}$ are multiplied by the estimate of the corresponding group-assessment classifier $\vec{G}_I$, while the estimated values of non-activated character network classifiers are pre-set with 1/number of classes prior to multiplication with the group estimate. With this classification expansion, it is possible to perform general alphanumeric recognition tasks completely on the basis of the method of the invention.

Further possible solutions:

1. Expansion to multi-class discriminators as base-class classifiers

The method is not limited in principle to the adaptation of the assessment classifier by way of an ensemble of two-class discriminators; rather, it can be expanded to ensembles of multi-class discriminators. Hence, in an ensemble comprising n class discriminators, the n-th class can represent the complement class to the remaining n−1 classes of the same discriminator in relation to all present classes.

2. Cascading system with classifiers of the invention: The practice of automatic reading operation shows that, with constant reading output, a considerable reduction in outlay is possible in that a control structure only calls the higher-structured recognition modules if a weaker-structured module has already attained an insufficient estimate quality for a present pattern. The classifiers according to the invention are incorporated seamlessly into this strategy. A system of classifiers according to the invention is constructed, which is classified as building in cascading fashion on one and the same base classifier. The (n+1)-th assessment classifier is trained with the patterns that have been estimated by the n-th assessment classifier as having an insufficient quality. In practical reading operation, this cascade generally breaks off after the first assessment classifier, but is continued for rare and difficult patterns, and thus increases the reading rate with a low increase in the calculation load.

What is claimed is:

1. A method of pattern recognition on the basis of statistics, which, for an object to be recognized, estimates an association of each target class of a class set with a numerical value on the basis of a complete ensemble of two- or multi-class classifiers, the numerical value resulting from cascaded application of polynomial classifiers, comprising the steps of: selecting the two- or multi-class classifiers whose estimates contribute the most, with high separation relevance, to minimizing a scalar measure calculated over an estimation-vector spectrum, from all two- or multi-class classifiers, over their estimation-vector spectrum on a learning sample in which all class patterns to be recognized are represented sufficiently;

using the selected two- or multi-class classifiers to form estimate vectors over an expanded learning sample;

using said estimate vectors to generate feature vectors that have been expanded through polynomial linking; and on the basis of said feature vectors, calculating an assessment classifier for estimating onto all target classes.

2. The method according to claim 1, wherein said step of selecting includes the step of using a sum of error squares in a discrimination space as said scalar measure.

3. The method according to claim 1, wherein said step of selecting includes the step of using entropy in a distribution space as said scalar measure, wherein frequency of appearance of each feature state of the two- or multi-class classifier estimates is determined over all feature states.

4. The method according to claim 1, further comprising the steps of:

dividing a large target-class quantity into a plurality of target-class quantities, for which said selecting of the two- or multi-class classifiers is performed, and wherein, from this, the assessment classifier is generated; and determining a resulting total estimate from results of the assessment classifiers.

5. The method according to claim 4, wherein said determining step includes the step of forming a Cartesian-expanded product vector from result vectors of the assessment classifiers, from which Cartesian-expanded product vector a quadratic assessment classifier that determines the total estimate is formed.

6. The pattern-recognition method according to claim 4, wherein said determining step includes the steps of forming a Cartesian-expanded product vector from result vectors of the assessment classifiers;

transferring said Cartesian-expanded product vector into a transformed vector by means of a subspace transformation using a transformation matrix having a corresponding eigenvalue distribution;

adapting a quadratic classifier using only the most critical components of said transformed vector, which components correspond to the eigenvalue distribution of the transformation matrix; and using the adapted quadratic classifier, mapping the transformed and reduced vector onto target classes for an estimated value.

7. The method according to claim 4, further comprising the step of, prior to activation of the step of selecting the two- or multi-class classifiers, a meta-class classifier that is trained over groups of class quantities generates estimates over the groups, which contain characters; and wherein:

said step of selecting includes the step of activating the two- or multi-class classifiers for the characters of the groups whose estimated values lie above an established threshold; and said determining step includes the step of linking the group estimates to the estimates of the respectively-associated character-assessment classifiers for the character classes contained in the respective group according to a unified rule such that the sum over all character estimates linked in this manner yields a number that can be normalized to 1.

8. An arrangement for pattern recognition on the basis of statistics, which, for an object to be recognized, estimates an association of each target class of a class set with a numerical value on the basis of a complete ensemble of two- or multi-class classifiers, the numerical value resulting from cascaded application of polynomial classifiers, comprising:

means for statistically-optimized selection of the two- or multi-class classifiers whose estimates contribute the most, with high separation relevance, to minimizing a scalar measure calculated over an estimation-vector spectrum, from a complete ensemble of all two- or multi-class classifiers based on their estimation-vector spectrum over a learning sample in which all class patterns to be recognized are represented to a sufficient extent;

means for generating polynomial-expanded feature vectors that represent the order of the system of selected two- or multi-class classifiers, said polynomial-expanded feature vectors being formed over an expanded learning sample, said expanding carried out by means of polynomial linking; and means for calculating an assessment classifier that uses the feature vectors of the system of selected two- or multi-class classifiers to calculate an estimation vector that, for each target class, contains a numerical value as an approximated conclusion probability regarding the association of a classified pattern with said class of patterns.

9. A method of pattern recognition for estimating input characters using probabilities of their memberships in n character classes, comprising the steps of:

performing an optimal selection procedure, the optimal selection procedure determining from a given system of N statistically non-independent classifiers a set of K classifiers that contribute the most to minimizing a scalar classification measure for all comparable subsystems of fixed dimension K, where K<N;

adjusting K such that a linear K-dimensional output vector of the subsystem can be polynomially extended to at least quadratic terms below a predetermined magnitude of terms; and constructing an optimal assessment classifier that uses the polynomially-extended output vector of the optimal subsystem as its input and maps it to a final probability vector for the n classes as its output.

* * * * *